US009906125B2

United States Patent
(12) United States Patent
Teh

(10) Patent No.: US 9,906,125 B2
(45) Date of Patent: Feb. 27, 2018

(54) POWER CIRCUIT WITH SWITCHING FREQUENCY CONTROL CIRCUIT AND CONTROL METHOD THEREOF

(71) Applicant: Kabushiki Kaisha Toshiba, Minato-Ku, Tokyo (JP)

(72) Inventor: Chen Kong Teh, Ota Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 14/624,250

(22) Filed: Feb. 17, 2015

(65) Prior Publication Data

US 2016/0056719 A1 Feb. 25, 2016

(30) Foreign Application Priority Data

Aug. 21, 2014 (JP) ................................ 2014-168688

(51) Int. Cl.
*H02M 3/156* (2006.01)
*H02M 3/157* (2006.01)
*H02M 3/158* (2006.01)

(52) U.S. Cl.
CPC ......... *H02M 3/157* (2013.01); *H02M 3/1563* (2013.01); *H02M 3/1588* (2013.01); *H02M 2003/1566* (2013.01); *Y02B 70/1466* (2013.01)

(58) Field of Classification Search
CPC .. H02M 3/157; H02M 3/1563; H02M 3/1588; H02M 2003/1566; H02M 3/156; H02M 3/158; H02M 3/33546; H02M 3/33507; H02M 2001/0025
See application file for complete search history.

(56) References Cited

U.S. PATENT DOCUMENTS 6,366,070 B1 * 4/2002 Cooke ................ H02M 3/1588 323/222
6,751,270 B1 * 6/2004 Choi ........................ H03J 7/02 375/326
8,373,397 B2 2/2013 Tanifuji et al.
8,854,024 B2 10/2014 Teh
9,256,234 B2 * 2/2016 Kay ......................... G05F 1/46
2006/0261794 A1 * 11/2006 May ..................... H02M 3/158 323/283
2009/0289612 A1 * 11/2009 Hojo .................... H02M 3/156 323/290

(Continued)

FOREIGN PATENT DOCUMENTS

JP H10-323028 A 12/1998
JP 2009-232487 A 10/2009

(Continued)

*Primary Examiner* — Gustavo Rosario Benitez
(74) *Attorney, Agent, or Firm* — White & Case LLP

(57) ABSTRACT

According to an embodiment, provided is a power circuit including: a switching transistor connected between an input terminal and an output terminal; a drive circuit configured to output a drive signal that controls on/off of the switching transistor; an error calculation circuit configured to output an error value between the output voltage and reference voltage; a determination circuit configured to compare a reference value obtained from the error value with a predetermined threshold value and then output a control signal; and a control circuit configured to control a frequency of the drive signal in response to the control signal.

14 Claims, 7 Drawing Sheets

1 12 2 14 3 Vin 10 13 $I_L$ Vout Iout 4 15 16 LOAD 18 Isense 17 23 22 21 20 PWM SIGNAL Reset R Q S DRIVE CIRCUIT COMPARATOR CIRCUIT Ictrl COMPENSATING CIRCUIT error ERROR CALCULATION CIRCUIT Vref 24 CLK CLOCK GENERATION CIRCUIT FINITE AUTOMATON enable DETERMINATION CIRCUIT 32 31 30

(56) References Cited

U.S. PATENT DOCUMENTS

| | | | | |
|---|---|---|---|---|
| 2009/0295341 | A1* | 12/2009 | Nakamura | H02M 3/1588 323/222 |
| 2009/0302817 | A1* | 12/2009 | Nagai | H02M 3/156 323/282 |
| 2010/0213856 | A1 | 8/2010 | Mizusako | |
| 2010/0237836 | A1* | 9/2010 | Fahrenbruch | H02M 3/1582 323/223 |
| 2010/0289471 | A1* | 11/2010 | Kasai | H02M 3/1588 323/282 |
| 2011/0115456 | A1* | 5/2011 | Tanifuji | H02M 3/156 323/283 |
| 2011/0199145 | A1* | 8/2011 | Kawai | H02M 3/156 327/419 |
| 2012/0038341 | A1* | 2/2012 | Michishita | H02M 3/158 323/284 |
| 2014/0140459 | A1* | 5/2014 | Greenspan | G06F 1/324 375/371 |
| 2014/0184180 | A1* | 7/2014 | Kronmueller | G05F 1/595 323/271 |
| 2015/0035510 | A1* | 2/2015 | Hoshino | H02M 3/157 323/283 |

FOREIGN PATENT DOCUMENTS

| | | | |
|---|---|---|---|
| JP | 2010-200427 | A | 9/2010 |
| JP | 2011109806 | A | 6/2011 |
| JP | 2012-110119 | A | 6/2012 |

* cited by examiner

POWER CIRCUIT WITH SWITCHING FREQUENCY CONTROL CIRCUIT AND CONTROL METHOD THEREOF

CROSS-REFERENCE TO RELATED APPLICATIONS

This application is based upon and claims the benefit of priority from Japanese Patent Application No. 2014-168688, filed on Aug. 21, 2014; the entire contents of which are incorporated herein by reference.

FIELD

Embodiments described herein relate generally to a power circuit and a control method therefor.

BACKGROUND

There is a known PWM control power circuit whereby desired output voltage is output by controlling, with a PWM signal, on/off ratio (duty ratio) of a switching transistor having a main current path connected between an input terminal and an output terminal. According to the PWM control, the output voltage supplied to a load is controlled by the on/off ratio (duty) of the switching transistor, but there is still room for improvement because responsiveness to load fluctuation is restricted by a switching frequency of the switching transistor.

DETAILED DESCRIPTION

According to the present embodiment, provided is a power circuit including: a switching transistor having a main current path connected between an input terminal applied with input voltage and an output terminal supplying output voltage; a drive circuit configured to output a drive signal that controls on/off of the switching transistor; an error calculation circuit configured to compare the output voltage with reference voltage and output an error value; a compensating circuit configured to generate and output a control value based on the error value of the error calculation circuit; a comparator circuit configured to compare feedback current of load current with the control value and output a signal indicating a result of the comparison; a determination circuit configured to compare a reference value obtained from the error value output from the error calculation circuit with a predetermined threshold value, and output a control signal when the error value exceeds the threshold value; and a control circuit configured to increase a frequency of a drive signal to be supplied to the switching transistor in response to the control signal.

Exemplary embodiments of a power circuit and a control method therefor will be described below in detail with reference to the accompanying drawings. Note that the present invention is not limited by the following embodiments.

First Embodiment

Figure 1:
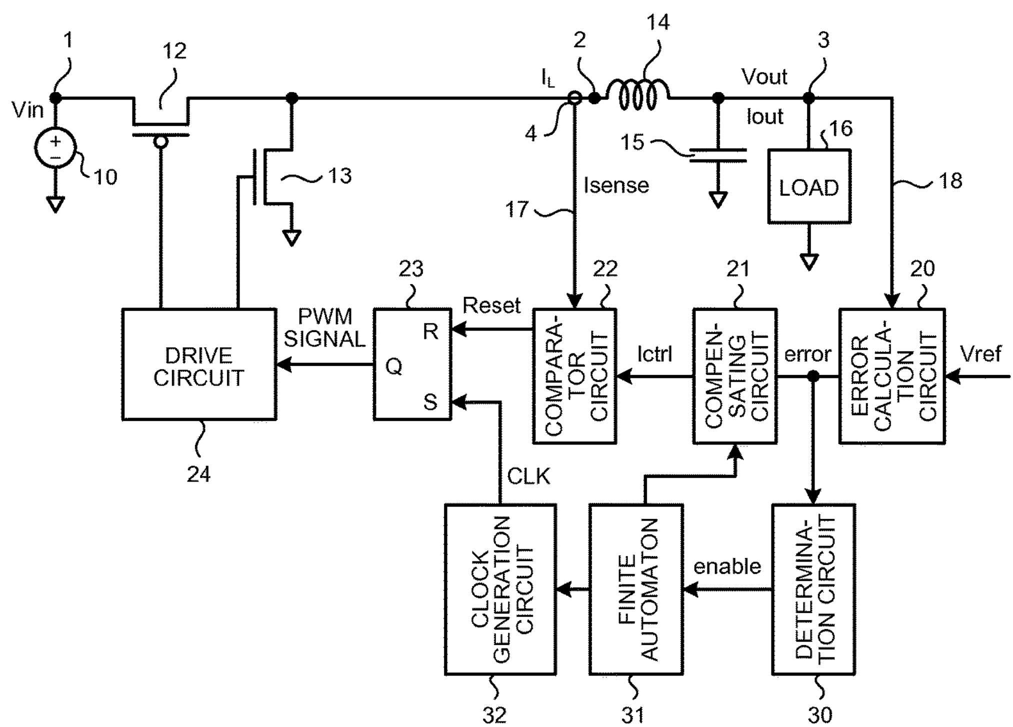
FIG. 1 is a diagram illustrating a configuration of a power circuit according to a first embodiment.

FIG. 1 is a diagram illustrating a configuration of a power circuit according to a first embodiment. The power circuit according to the present embodiment includes an input terminal 1. An input voltage source 10 to supply DC voltage Vin is connected to the input terminal 1. A first switching transistor 12 has a source electrode connected to the input terminal 1. The first switching transistor 12 has a drain electrode connected to a terminal 2. The first switching transistor 12 has a gate electrode connected to a drive circuit 24. On/off of the first switching transistor 12 is controlled by a drive signal from the drive circuit 24. A source-drain path, namely, a main current path of the first switching transistor 12, is connected between the input terminal 1 and an output terminal 3.

A second switching transistor 13 has a drain electrode connected to the drain electrode of the first switching transistor 12. The second switching transistor 13 has a source electrode grounded. The second switching transistor 13 has a gate electrode connected to the drive circuit 24. The second switching transistor 13 is controlled to be turned on/off by the drive signal from the drive circuit 24 complementarily with respect to the first switching transistor 12.

An inductance 14 has one end connected to the terminal 2. The inductance 14 has the other end connected to the output terminal 3. A smoothing capacitor 15 has one end connected to the output terminal 3. The smoothing capacitor 15 has the other end grounded. The output terminal 3 is connected to a load 16. DC output voltage Vout of the output terminal 3 is supplied to the load 16.

The output voltage Vout is supplied to an error calculation circuit 20 via a feedback loop 18. The error calculation circuit 20 is supplied with predetermined reference voltage Vref. The error calculation circuit 20 compares the output voltage Vout with the reference voltage Vref, and outputs an error value error. The error value error is supplied to a compensating circuit 21. The compensating circuit 21 receives the error value error from the error calculation circuit 20 and executes PID (Proportional Integral Derivative) control so as to equalize the output voltage Vout to the reference Vref, and generates and outputs a control value Ictrl for the control.

The control value Ictrl is supplied to a comparator circuit 22. To the comparator circuit 22, feedback current Isense obtained from inductance current $I_L$ is supplied via a feedback loop 17. The inductance current $I_L$ is detected by a current sensor 4 and supplied to the comparator circuit 22 as the feedback current Isense. The current sensor 4 includes, for example, a differential amplifier (not illustrated) configured to detect a resistance connected to the inductance 14 in series and voltage drop occurring at the resistance. The inductance current $I_L$ is supplied to the output terminal 3 via the inductance 14, and supplied to the load 16 as output current Iout. Therefore, load current, namely, the output current Iout can be detected by detecting the inductance current $I_L$ and returning the inductance current $I_L$ as the feedback current Isense.

The comparator circuit 22 compares the feedback current Isense with the control value Ictrl, and supplies a reset signal Reset to an RS latch circuit 23 when the feedback current Isense becomes larger than the control value Ictrl.

The error value error from the error calculation circuit 20 is supplied to a determination circuit 30. The determination circuit 30 determines whether the output voltage Vout continuously decreases or continuously increases. For example, the determination circuit 30 includes a memory circuit (not illustrated) and keeps error values error of latest five cycles. Also, for example, the determination circuit 30 includes a comparator circuit (not illustrated) to configured compare a total value of the error values error with a predetermined threshold value. In the case where the total value of the error values error of the five cycles becomes larger than the predetermined threshold value, it is determined that the output voltage Vout continuously decreases or continuously increases, and such information is supplied to a finite automaton 31 as an enable signal enable.

The finite automaton 31 includes a configuration in which a frequency of a clock generation circuit 32 is switched in accordance with the enable signal enable from the determination circuit 30. More specifically, for example, in the case where the output voltage Vout continuously decreases or increases, control is executed such that the frequency of a clock signal CLK output from the clock generation circuit 32 is increased, for example, double. Then, after a preset period has passed, control is executed such that the frequency of the clock signal CLK of the clock generation circuit 32 is returned to an original frequency.

The clock generation circuit 32 includes, for example, a ring oscillator (not illustrated) and a counter (not illustrated). The clock signal CLK of the clock generation circuit 32 can be controlled to rise and fall by suitably setting a counter value of the counter. For example, a configuration may made so as to generate a clock signal CLK that rises at zeroth counter value and that falls at a $n^{th}$ counter value of a reference clock signal (not illustrated) in the ring oscillator may be applied. Meanwhile, a configuration may also be made so as to use a signal of a reference frequency (not illustrated) supplied from outside.

The finite automaton 31 is connected to the compensating circuit 21. For example, a compensation coefficient of the compensating circuit 21 can be forcibly rewritten by control of the finite automaton 31.

The clock signal CLK of the clock generation circuit 32 is supplied to a set input terminals S of the RS latch circuit 23. By this, the RS latch circuit 23 is reset by the reset signal Reset of the comparator circuit 22, and a PWM signal set by the clock signal CLK of the clock generation circuit 32 is output from an output terminal Q.

The PWM signal from the RS latch circuit 23 is supplied to the drive circuit 24. The drive circuit 24 supplies a drive signal to the gate electrodes of the first switching transistor 12 and the second switching transistor 13 in response to the PWM signal from the RS latch circuit 23. The first switching transistor 12 and the second switching transistor 13 are controlled to be complementarily turned on/off. When the first switching transistor 12 is turned on, the output voltage Vout is increased. More specifically, while the first switching transistor 12 is turned on, that is, when the duty is high, control is made to increase the output voltage Vout.

According to the present embodiment, provided is a configuration in which the frequencies of the drive signals to be supplied to the first switching transistor 12 and the second switching transistor 13 can be increased in the case where the output voltage Vout continuously increases or continuously decreases. More specifically, the frequency of the clock signal CLK to be supplied to the RS latch circuit 23 that generates the PWM signal can be increased in response to continuous fluctuation of the output voltage Vout. With this configuration, the number of times of executing comparing operation between the feedback current Isense indicating the load state and the control value Ictrl can be increased. Accordingly, the output voltage Vout can be controlled so as to be able to handle fluctuation even in the case where the load rapidly fluctuates. Further, in a normal state, the switching frequencies of the first switching transistor 12 and the second switching transistor 13 can be kept low. Accordingly, power consumed at the time of executing switching operation between the first switching transistor 12 and the second switching transistor 13 can be reduced.

Second Embodiment

Figure 2:
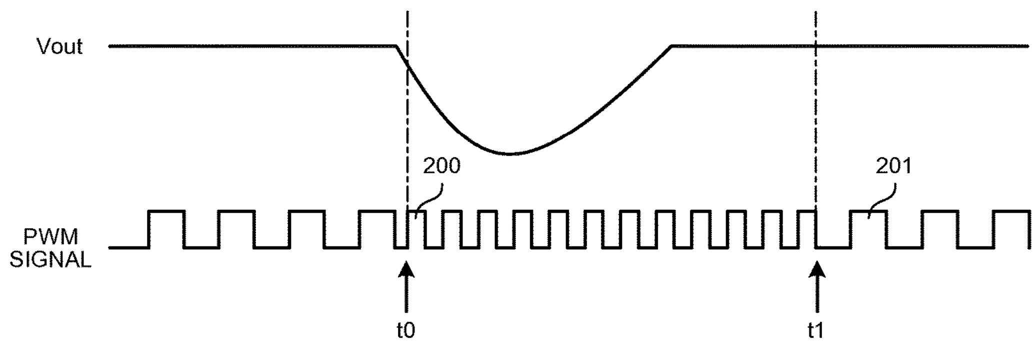
FIG. 2 is a diagram for describing a control method for a power circuit according to a second embodiment.

FIG. 2 is a diagram for describing a control method for a power circuit according to a second embodiment. An upper portion indicates an output voltage Vout. A lower portion indicates a PWM signal. A frequency of the PWM signal represents a state of a clock signal CLK because the frequency of the PWM fluctuates in accordance with the clock signal CLK of a clock generation circuit 32.

When the output voltage Vout continuously decreases, a frequency of the clock signal CLK of the clock generation circuit 32 is increased double at timing t0, for example. Such control is executed in the case where a determination circuit 30 detects that a total value of error values error in latest five cycles output from an error calculation circuit 20 exceeds a predetermined threshold value. More specifically, whether the output voltage Vout continuously decreases is determined by comparing the error values error during a period of the latest five cycles with the predetermined threshold value. The control is executed under control of a finite automaton 31 in response to a signal enable from the determination circuit 30. Further, control to increase the frequency of the clock signal CLK is executed at the timing t0 when the determination circuit 30 determines that the output voltage Vout continuously decreases. More specifically, a phase of the clock signal CLK is shifted, and control is executed so as to raise an initial clock signal 200 having the frequency increased double at the timing t0. For instance, a counter value of a counter of the clock generation circuit 32 is reset at the timing t0, and the initial clock signal 200 is output from the clock generation circuit 32 at the timing t0. By executing such control to instantly raise the frequency which has been increased double, the continuous fluctuation of the output voltage Vout can be quickly handled. As a result, the output voltage Vout can be prevented from fluctuation. The PWM signal is output from an RS latch circuit 23 in response to the clock signal CLK from the clock generation circuit 32.

The frequency of the clock signal CLK of the clock generation circuit 32 is returned to an original frequency at timing t1 when a predetermined period has passed. An initial clock signal 201 having the frequency returned to the original frequency executes control to raise the frequency of the clock signal at timing when a predetermined has passed from the timing t1. For instance, at the timing t1, a counter value of the clock generation circuit 32 is set to ½ of the count value of the clock generation circuit 32 for generating a clock signal CLK after frequency switch. By this setting, the initial clock signal 201 having the newly set frequency can be raised at timing of the ½ cycle of the clock frequency after frequency switch. In this manner, switching of the clock frequency can be smoothly executed.

Figure 3:
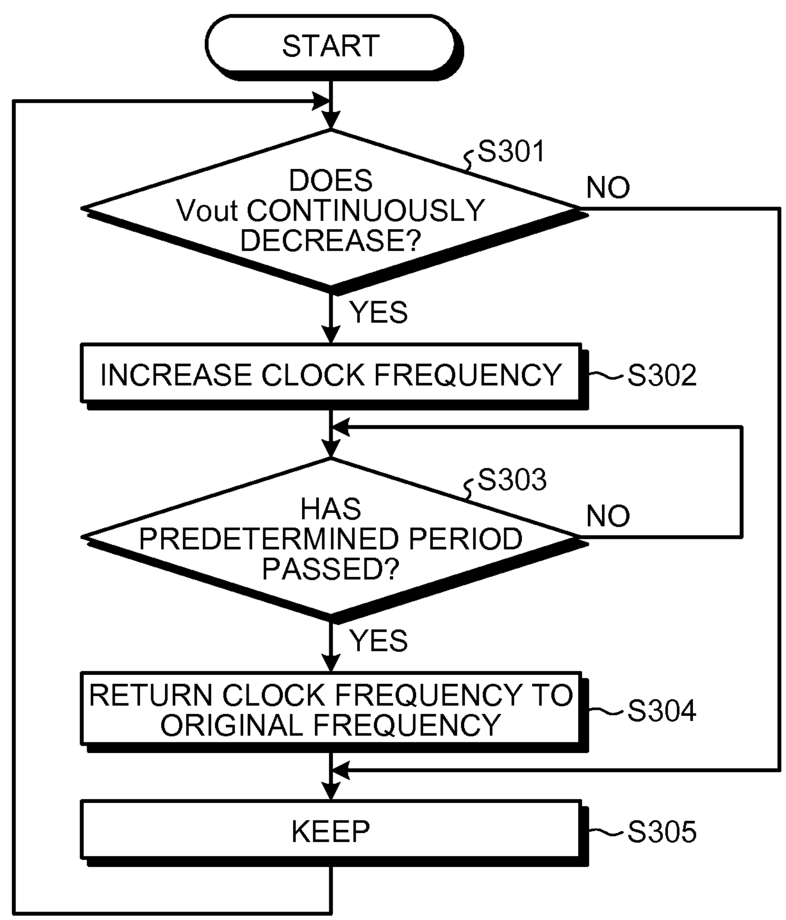
FIG. 3 is a flowchart of the control method for the power circuit according to the second embodiment.

FIG. 3 is a flowchart of a control method according to the second embodiment. A description will be given for an example of control in the case where a load becomes heavy and the output voltage Vout decreases. It is determined whether the output voltage Vout continuously decreases (S301). This determination is made by comparing the total value of the error values error in the latest five cycles output from the error calculation circuit 20 with the predetermined threshold value in the determination circuit 30, for example. In the case where the output voltage Vout does not continuously decrease, the state is kept as it is.

In the case where the output voltage Vout continuously decreases, the frequency of the clock signal CLK of the clock generation circuit 32 is increased (S302). For instance, the frequency of the clock signal CLK is increased double. When the predetermined period has passed (S303), the frequency of the clock signal CLK of the clock generation circuit 32 is returned to the original frequency (S304). The predetermined period can be set by a timer (not illustrated) provided at the finite automaton 31, for example, in a step (S302) in which the clock frequency of the clock generation circuit 32 is increased.

The control is kept in a state that the frequency of the clock signal CLK is returned to the original frequency (S305).

Note that the same control can be applied to the case where the output voltage Vout continuously increases. In the case where the output voltage Vout continuously increases, the error value error becomes continuously a negative value, for example. Therefore, in the same manner, the continuous increase of the output voltage Vout can be detected by comparing the total value of the error values error in the latest five cycles with the predetermined threshold value.

Further, the control to return the frequency of the clock signal CLK to the original frequency (S304) may be executed in the case where the error value error becomes continuously zero. In the case where fluctuation of the output voltage Vout is settled, the error value error continuously becomes zero. Therefore, this timing can be used to return the frequency of the clock signal CLK to the original frequency. More specifically, the control to return the frequency of the clock signal CLK to the original frequency can be executed by determining whether the error value error is continuously zero instead of determining whether the predetermined period passed (S303).

Figure 4:
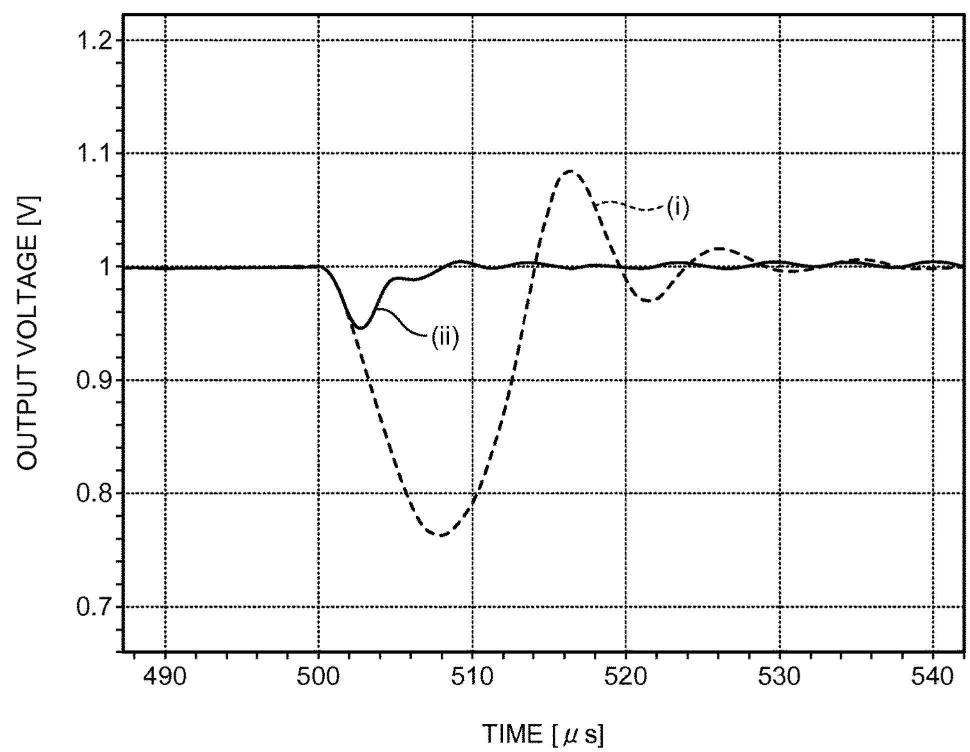
FIG. 4 is a diagram illustrating a simulation result.

FIG. 4 is a diagram illustrating an effect of the present embodiment. A simulation result of the output voltage Vout in the case of applying load fluctuation is illustrated. A case of previous and current control in which the frequency of the clock signal CLK is not increased is indicated by a dashed line (i). A case of control in which the control method according to the present embodiment is executed indicated by a solid line (ii). According to the present embodiment, in the case where the output voltage Vout continuously decreases, control is executed so as to increase the frequency of the clock signal CLK. As a result, the output voltage Vout is prevented from decreasing, therefore, rippled of the output voltage Vout is reduced to approximately one-fifth. According to the present embodiment, it is clear that fluctuation of the output voltage Vout caused by the load fluctuation can be quickly handled.

Third Embodiment

Figure 5:
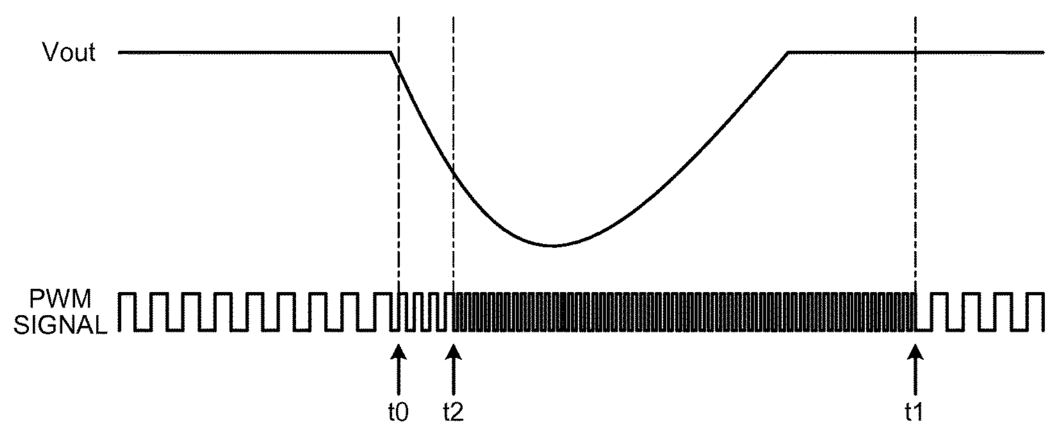
FIG. 5 is a diagram for describing a control method for a power circuit according to a third embodiment.

FIG. 5 is a diagram for describing a control method for a power circuit according to a third embodiment. According to the control method of the present embodiment, in the case where the output voltage Vout continuously decreases, control is executed so as to gradually increase a frequency of a clock signal CLK of the clock generation circuit 32. More specifically, control is executed so as to further increase the frequency of the clock signal CLK at timing t2 in addition to increasing the frequency of the clock signal CLK at timing t0. For instance, the frequency of the clock signal CLK of a clock generation circuit 32 is increased double at the timing t0, and additionally increased double at the timing t2, more specifically; the control is executed so as to increase the frequency four times of an initial frequency. By this, responsiveness to load fluctuation can be further improved because the number of comparing operation between feedback current Isense and a control value Ictrl is increased. Meanwhile, determination made by a determination circuit 30 at the timing t2 can be made in accordance with a comparison result of comparing a total value of error values error in latest five cycles of an error calculation circuit 20 with a predetermined threshold value in the same manner as the control at the timing t0.

Figure 6:
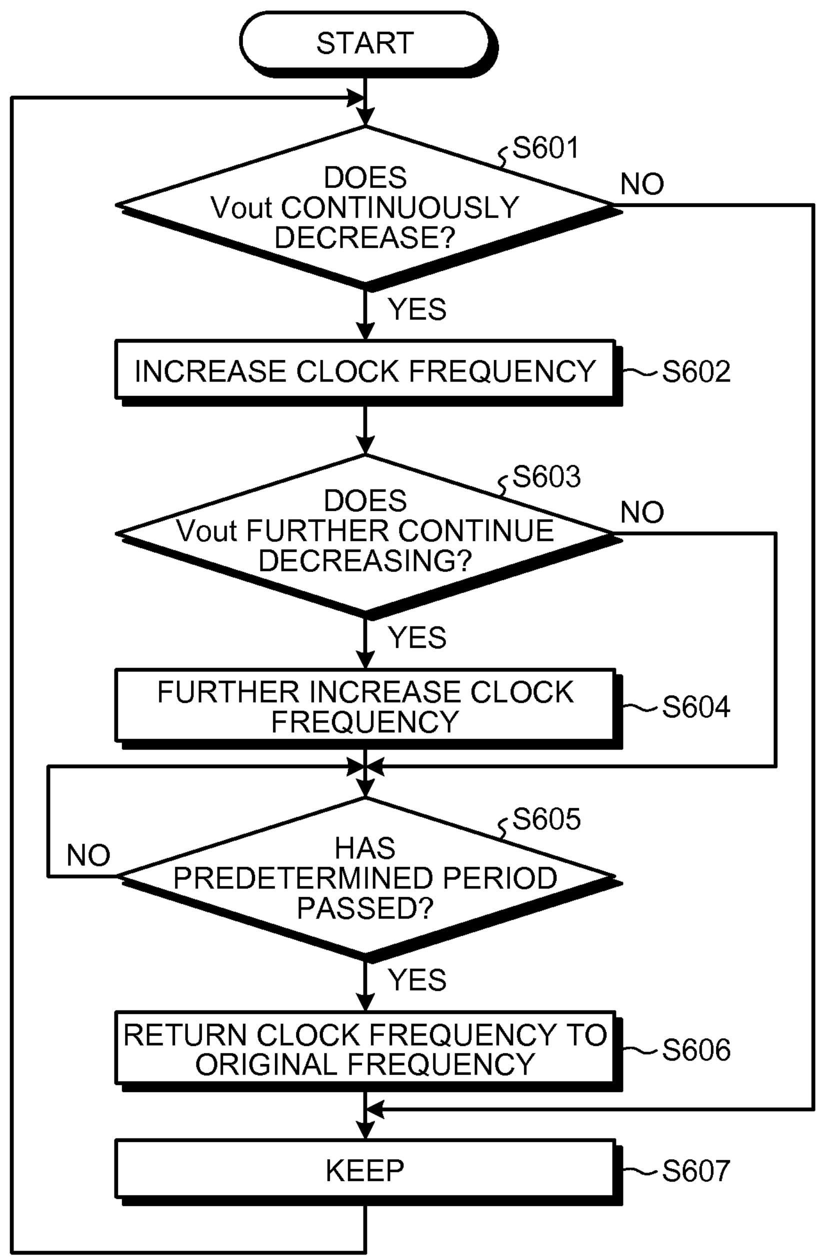
FIG. 6 is a flowchart of a control method for the power circuit according to the third embodiment.

FIG. 6 is a flowchart of the control method according to a third embodiment. A description will be given for an example of control in the case where a load becomes heavy and the output voltage Vout decreases. It is determined whether the output voltage Vout continuously decreases (S601). This determination is made by comparing the total value of the error values error in the latest five cycles from the error calculation circuit 20 with the predetermined threshold value in determination circuit 30, for example. In the case where the output voltage Vout does not continuously decrease, the state is kept as it is.

In the case where the output voltage Vout continuously decreases, the frequency of the clock signal CLK of the clock generation circuit 32 is increased (S602). For instance, the frequency of the clock signal CLK is increased double.

At timing when a predetermined period has passed, determination is made whether the output voltage Vout further continuously decreases (S603). In the case where the output voltage Vout continuously decreases, the frequency of the clock signal CLK of the clock generation circuit 32 is further increased (S604). For instance, the frequency of the clock signal CLK is further increased double, therefore, the frequency is increased four times of the original frequency.

It is determined whether the predetermined period has passed (S605). In the case where the predetermined period has passed, the frequency of the clock signal CLK of the clock generation circuit 32 is returned to the original frequency (S606). The predetermined period can be set by a timer (not illustrated) provided at a finite automaton 31, for example, in step (S604) in which the clock frequency of the clock generation circuit 32 is further increased. The control is kept in a state that the frequency of the clock signal CLK is returned to the original frequency (S607).

The same control can be applied to the case where the output voltage Vout continuously increases. In the case where the output voltage Vout continuously increases, the error value error becomes continuously a negative value, for example. Therefore, in the same manner, the continuous increase of the output voltage Vout can be detected by comparing the total value of the error values error in the latest five cycles with the predetermined threshold value.

Fourth Embodiment

Figure 7:
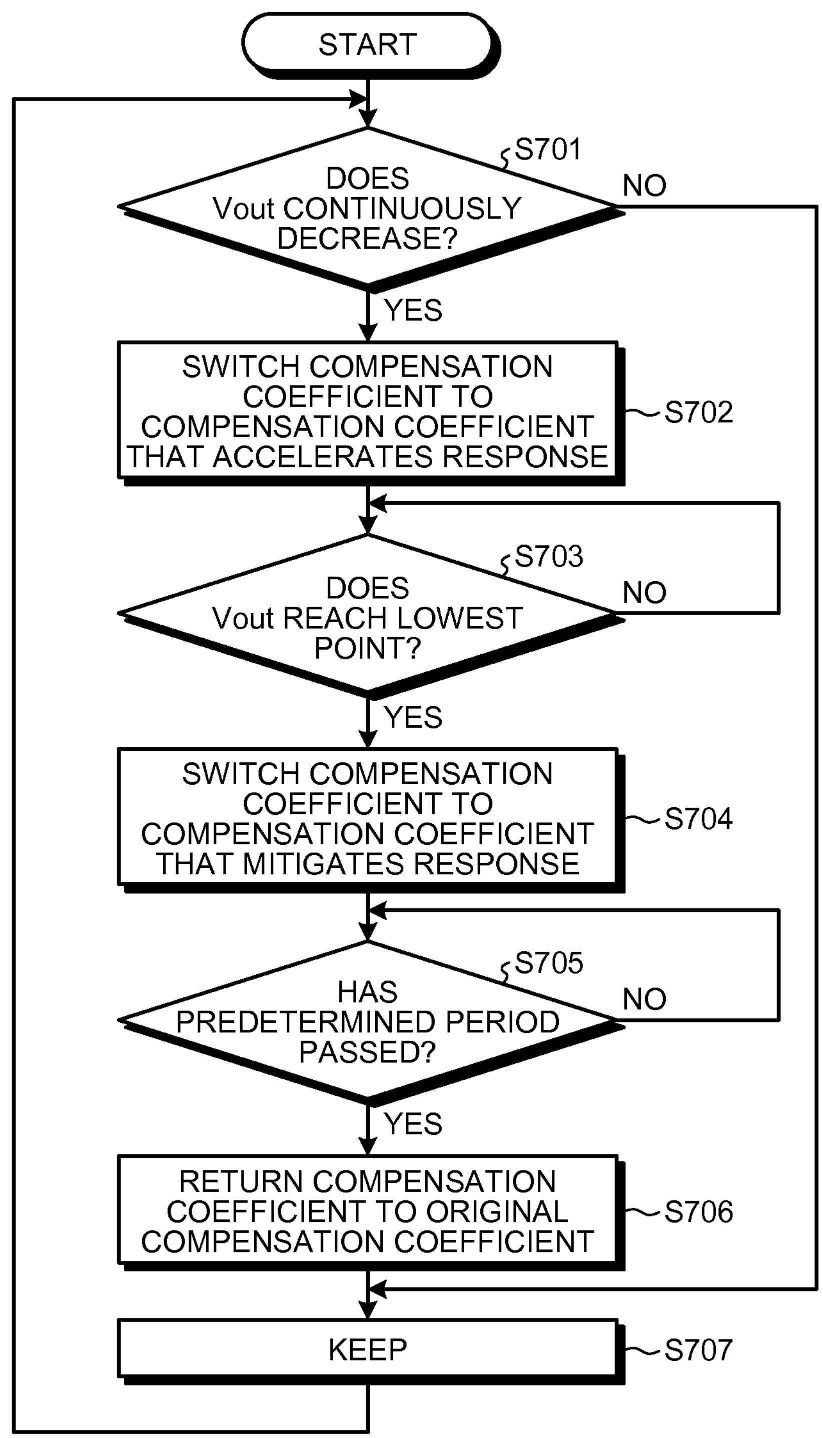
FIG. 7 is a flowchart of a control method for a power circuit according to a fourth embodiment.

FIG. 7 is a flowchart of a control method for a power circuit according to a fourth embodiment. According to the present embodiment, in the case where output voltage Vout continuously decreases, control is executed such that a compensation coefficient of a compensating circuit 21 is forcibly changed.

A control value Ictrl output from the compensating circuit 21 is represented by a following expression (1), for example.

$$Ictrl[n]=Ictrl[n-1]+a\times error[n]+b\times error[n-1]+c\times error[n-2]+d\times error[n-3] \quad (1)$$

Here, error indicates an error value, and a, b, c, and d indicate compensation coefficients. Further, [n] indicates a current value, [n−1] indicates a value one cycle before, [n−2] indicates a value two cycles before, and [n−3] indicates a value three cycles before.

It is determined whether the output voltage Vout continuously decreases (S701). A determining method is same as the cases according to above-described embodiments. For instance, determination is made by comparing a total value of error values error in latest five cycles output from an error calculation circuit 20 with a predetermined threshold value in a determination circuit 30. In the case where the output voltage Vout does not continuously decrease, the state is kept as it is (S707). In other words, the compensation coefficients are not changed.

In the case where the output voltage Vout continuously decreases, the compensation coefficients (a, b, c, d) are changed and rewritten to values that accelerate response (S702). For instance, the coefficients are changed such that the control value Ictrl becomes a large value. The control value Ictrl is generated as a control value for PID control in the compensating circuit 21. The PID control can be accelerated by increasing the control value Ictrl. Several sets of the compensation coefficients (a, b, c, d) may be prepared, and suitable compensation coefficients may be selected in accordance with a determination result of the determination circuit 30 to rewrite the compensation coefficients of the compensating circuit 21. For instance, following three sets of the compensation coefficients may be prepared: compensation coefficients 1 for a normal operating state, compensation coefficients 2 for handling continuous decrease of the output voltage Vout, and compensation coefficients 3 for setting after the output voltage Vout reaching a lowest point. The compensation coefficients 2 may be set to values that accelerate response, and the compensation coefficients 3 may be set to values following thereafter. For example, in step S702, the compensation coefficients (a, b, c, d) of the compensating circuit 21 are rewritten to the compensation coefficients 2 that accelerate the response most.

It is determined whether the output voltage Vout has reached the lowest point (S703). For example, digitalized output voltage Vout may be preliminarily sampled and stored, and the output voltage Vout previously sampled may be sequentially compared with output voltage Vout sampled next, thereby achieving to determine whether the output voltage Vout has reached the lowest point. A detection circuit for the lowest-point of the output voltage Vout (not illustrated) is provided in a finite automaton 31, for example.

When the output voltage Vout has reached the lowest point, the coefficients are switched to the compensation coefficients that mitigate response (S704). For example, the compensation coefficients of the compensating circuit 21 are rewritten to the compensation coefficients 3. Meanwhile, in step S704, a finish time is set together with switching of the compensation coefficients. For example, the finish time can be set by a timer (not illustrated) provided at the finite automaton 31. When a predetermined setting time has passed (S705), the compensation coefficients of the compensating circuit 21 are returned to the original compensation coefficients (S706). In other words, the coefficients are rewritten to the compensation coefficients 1 for the normal state. The control is continued in the state that the compensation coefficients are returned to the original ones (S707). Further, the control may be executed such that the compensation coefficients are returned to the original coefficients, more specifically, rewritten to the compensation coefficients 1 (S706) when the output voltage Vout is detected to be the lowest point in step S703, omitting step S704 and step S705.

According to the control method of the present embodiment, in the case where the output voltage Vout continuously decreases, control is executed such that the compensation coefficients of the compensating circuit 21 are switched to the compensation coefficients that accelerate response. For example, the control to rewrite the compensation coefficients according to the present embodiment is used combined with the control according to above-described embodiments, more specifically, control to increase the frequency of the clock signal CLK when the output voltage Vout continuously decreases. Rapid load fluctuation can be handled by using the control to increase the clock signal CLK and the control to switch the compensation coefficients in a combining manner. For example, even when the control value Ictrl is set to a large value in order to accelerate response, the number of comparison between the control value Ictrl and feedback current Isense can be increased by increasing the frequency of the clock signal CLK. Therefore, response speed to load fluctuation can be accelerated.

The same control can be applied to the case where the output voltage Vout continuously increases. In the case where the output voltage Vout continuously increases, the error value error becomes continuously a negative value, for example. Therefore, in the same manner, the continuous increase of the output voltage Vout can be detected by comparing the total value of the error values error in the latest five cycles with the predetermined threshold value. In the case where the output voltage Vout continuously increases, control is executed depending on whether the output voltage Vout has reached a highest point instead of determining whether the output voltage Vout has reached the lowest point (S703).

Fifth Embodiment

Figure 8:
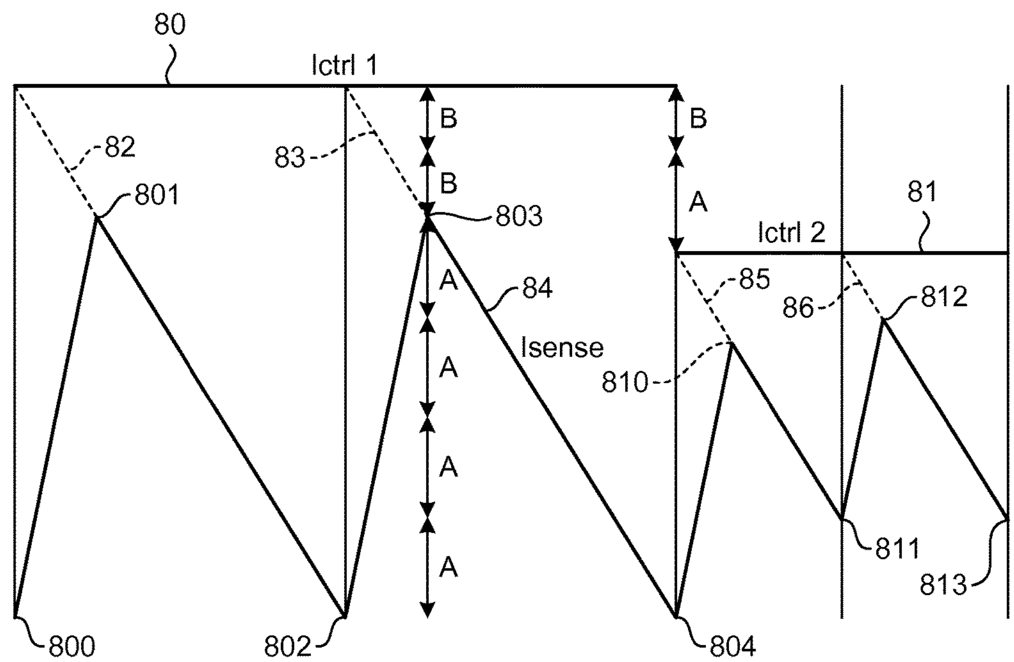
FIG. 8 is a diagram for describing a control method for a power circuit according to a fifth embodiment.

FIG. 8 is a diagram for describing a control method for a power circuit according to a fifth embodiment. The present embodiment is a method for setting a control value Ictrl in the case of executing control to increase a frequency of a clock signal CLK. In FIG. 8, a line 80 indicates the control value Ictrl1. The solid line 84 indicates feedback current Isense. There is a known technology whereby control resistant to noise can be executed by correcting the control value Ictrl1 to a value conforming to a slope of inductance current $I_L$ decreasing in accordance with a inductance value of an inductance 14 (hereinafter referred to as slope correction). Dashed lines (82, 83) indicate control values corrected by the slope correction. Upper-side points (801, 803) indicate points where the feedback current Isense reaches the control value corrected by the slope correction. Lower-side points (800, 802, 804) of the feedback current Isense are controlled by the clock signal CLK supplied to a set input terminal S of an RS latch circuit 23.

A line 81 indicates a control value Ictrl2 in the case where control to increase the frequency of the clock signal CLK double is executed. In the same manner, dashed line (85, 86) indicate control values corrected by the slope correction. Upper-side points (810, 812) indicate points where the feedback current Isense reaches the control values corrected by the slope correction. Lower-side points (811, 813) of the feedback current Isense are controlled by a new clock signal CLK supplied to the set input terminal S of the RS latch circuit 23, namely, the clock signal CLK having the frequency increased double.

While a principle will be described later, in the event of executing the control to increase the frequency of the clock signal CLK double, for example, in the case where a peak value of the feedback current Isense before increasing the frequency of the clock signal CLK, namely, the value at the point 803 is 2×A and a difference between the control value Ictrl1 and the point 803 is 2×B, a value of the control value Ictrl2 in the case where the frequency of the clock signal CLK is increased double is set to a value lower than the control value Ictrl1 by an amount (A+B). By this, average values of the feedback current Isense in the control before and after switching the frequency of the clock signal CLK can be equalized. Therefore, the output voltage Vout can be prevented from ripple caused by switching the frequency of the clock signal CLK. Further, the peak value of the feedback current Isense or amplitude, namely, a value of 4×A, can be acquired by supplying the feedback current Isense to a finite automaton 31 and being processed by an AD converter (not illustrated) and an arithmetic circuit (not illustrated) provided at the finite automaton 31.

Sixth Embodiment

Figure 9:
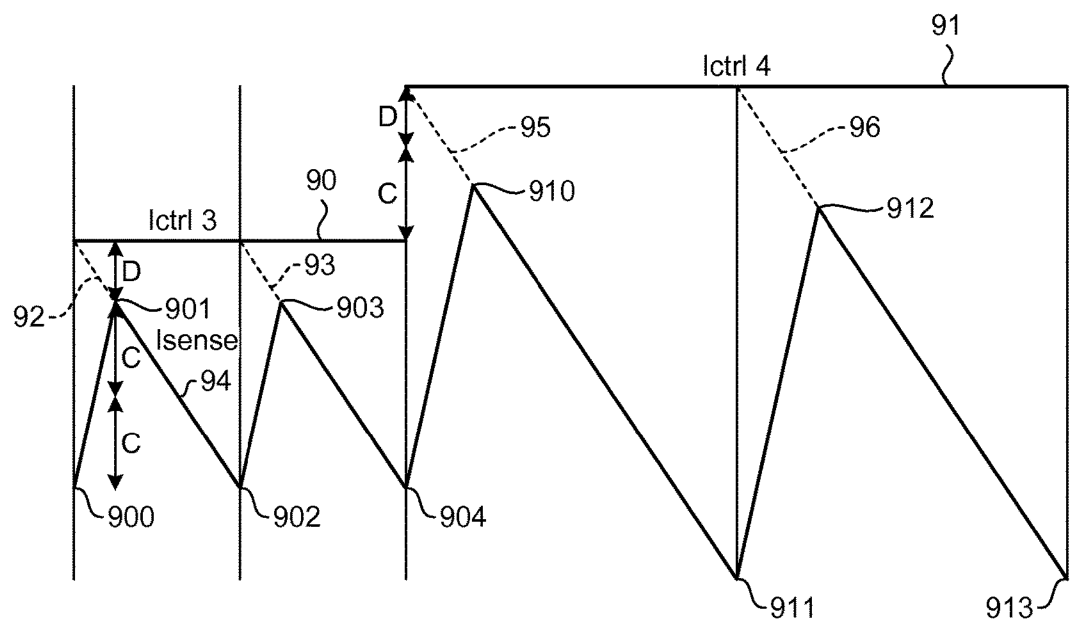
FIG. 9 is a diagram for describing a control method for a power circuit according to a sixth embodiment.

FIG. 9 is a diagram for describing a control method for a power circuit according to a sixth embodiment. The present embodiment is a method for setting a control value Ictrl in the case of executing control to decrease a frequency of a clock signal CLK, for example, by returning the frequency to an original frequency. In FIG. 9, a line 90 indicates a control value Ictrl3. A solid line 94 indicates feedback current Isense. Dashed lines (92, 93) indicate control values corrected by slope compensation. Upper-side points (901, 903) indicate points where the feedback current Isense reaches the control value corrected by the slope correction. Lower-side points (900, 902, 904) of the feedback current Isense are controlled by the clock signal CLK supplied to a set input terminal S of an RS latch circuit 23.

A line 91 indicates a control value Ictrl4 in the case of executing control to decrease the frequency of the clock signal CLK to ½. In the same manner, dashed lines (95, 96) indicate control values corrected by the slope correction. Upper-side points (910, 912) indicate points where the feedback current Isense reaches the control value corrected by the slope correction. Lower-side points (911, 913) of the feedback current Isense are controlled by a new clock signal CLK supplied to the set input terminal S of the RS latch circuit 23, namely, the clock signal CLK having the frequency decreased to ½.

While a principle will be described later, in the event of executing the control to decrease the frequency of the clock signal CLK to ½, for example, in the case where a peak value of the feedback current Isense before decreasing the frequency of the clock signal CLK, namely, the value at the point 901 is 2×C and a difference between a control value Ictrl3 and the point 901 is D, a value of the control value Ictrl4 in the case of decreasing the frequency of the clock signal CLK to ½ is set to a value larger than the control value Ictrl1 by an amount (C+D). By this, average values of the feedback current Isense in the control before and after switching the frequency of the clock signal CLK can be equalized. In this manner, the output voltage Vout can be prevented from ripple caused by switching the clock signal CLK.

Figure 10:
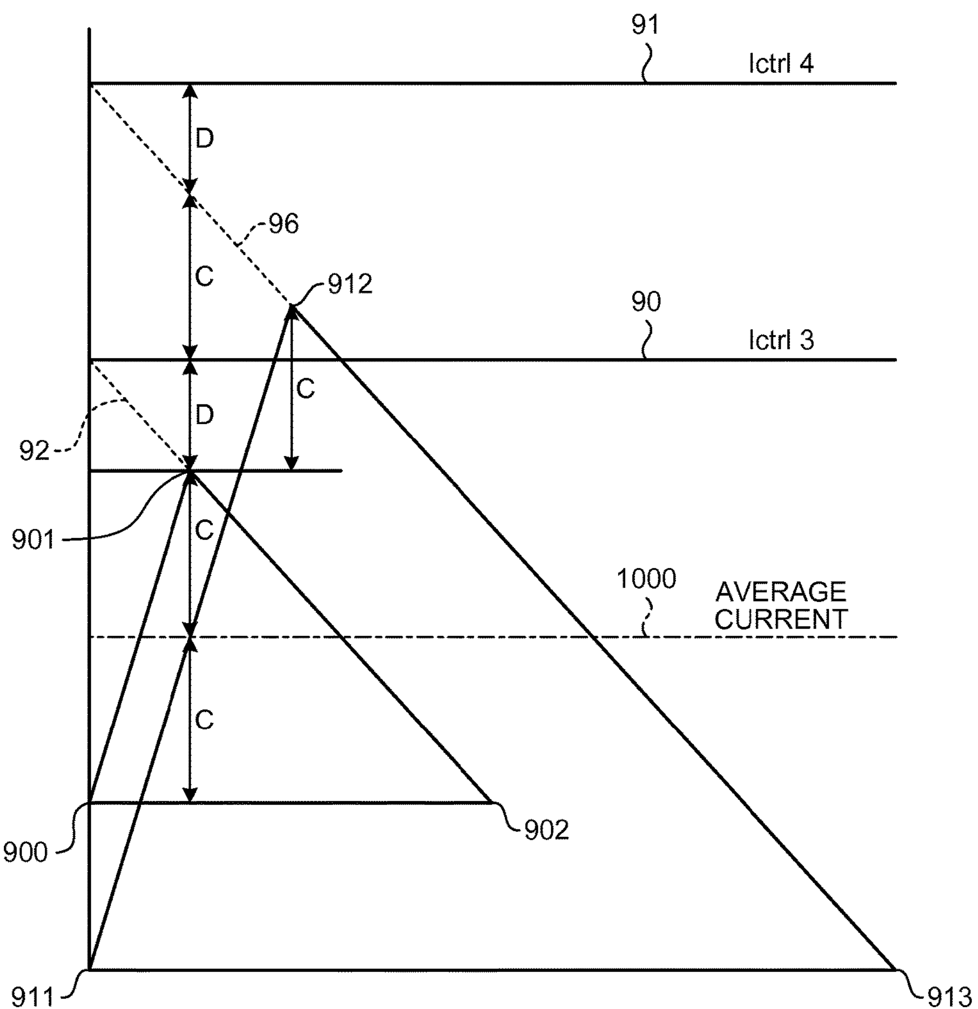
FIG. 10 is a diagram for describing a principle of the control method for the power circuit according to the sixth embodiment.

FIG. 10 is a diagram for describing the principle of the control method according to a sixth embodiment. The points corresponding to FIG. 9 are denoted by the same reference signs. A triangle represented by the points 900, 901, and 902 corresponds to a waveform of the feedback current Isense before switching the frequency of the clock signal CLK. In the same manner, a triangle represented by the points 911, 912, and 913 corresponds to the feedback current Isense in the case of switching the frequency of the clock signal CLK and decreasing the frequency to ½.

A distance from the point 900 to the point 902 and a distance from the point 911 to the point 913 are controlled by the clock signal CLK respectively. In the case of switching the frequency of the clock signal CLK to a frequency ½ thereof, the distance becomes double. Therefore, the triangle represented by the points 900, 901, and 902 and the triangle represented by the points 911, 912, and 913 are similar figures having a side length ratio of one to two. A line 1000 indicating an average value of the feedback current Isense becomes the same by setting the control value Ictrl4 after switching the frequency to a value larger than the control value Ictrl3 before switching the frequency by an amount C+D. In other words, the average values of the feedback current Isense before and after switching the frequency of the clock signal CLK can be equalized. In this manner, the output voltage Vout can be prevented from ripple caused by switching the frequency of the clock signal CLK. The same principle is applied to the embodiment in FIG. 8, namely, the case of executing the control to increase the frequency of the clock signal CLK.

Seventh Embodiment

Figure 11:
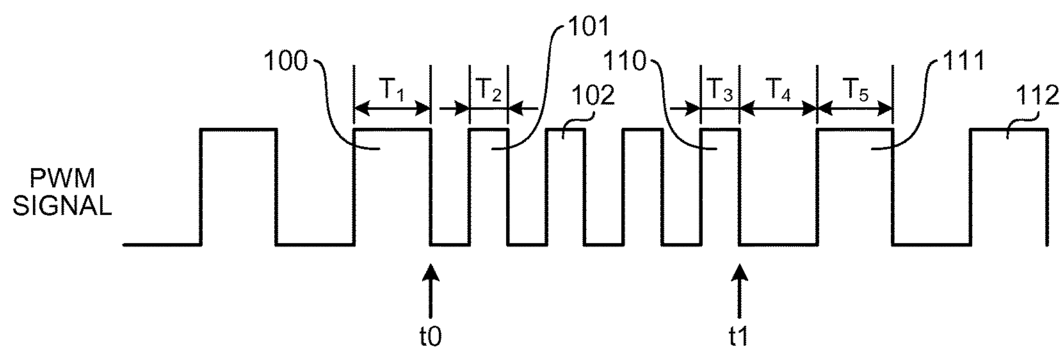
FIG. 11 is a diagram for describing a control method for a power circuit according to a seventh embodiment.

FIG. 11 is a diagram for describing a control method for a power circuit according to a seventh embodiment. According to the present embodiment, in the case where output voltage Vout continuously decreases, control is executed such that a frequency of a clock signal CLK to be supplied to a switching transistor is changed and also an on-period of a PWM signal is changed.

In FIG. 11, timing t0 is the timing to determine that the output voltage Vout continuously decreases, and increase the frequency of the clock signal CLK double, for example. According to the present embodiment, an on-period T2 of an initial PWM signal 101 after executing control to switch the frequency is controlled to become ½ of an on-period T1 of the PWM signal 100 before switching the frequency. In other words, control is executed such that a value obtained by multiplying a multiplication factor of the frequency by the on-period of the PWM signal becomes constant before and after switching the frequency. By this, the output voltage Vout is prevented from ripple caused by switching the frequency of the clock signal CLK. That is because an average value of the inductance current $I_L$ before and after switching the frequency of the clock signal CLK is prevented from fluctuation. Meanwhile, the on-period T2 of the initial PWM signal 101 when the frequency of the clock signal CLK is switched is controlled by a counter provided at a clock generation circuit 32. In other words, for example, the initial PWM signal 101 is supplied directly from the clock generation circuit 32 to a drive circuit 24 instead of being supplied from an RS latch circuit 23. A PWM signal 102 after the initial PWM signal 101 is supplied from the RS latch circuit 23. In other words, the PWM signal set by the clock signal CLK and reset by an output signal of a comparator circuit 22 is supplied to the drive circuit 24.

Timing t1 is the timing to return the frequency of the clock signal CLK to an original frequency. For example, this is the timing to return the clock signal CLK having the frequency increased double to the clock signal CLK having the original frequency. At the timing t1, control is executed such that an on-period T5 of an initial PWM signal 111 after executing control to switch the frequency of the clock signal CLK becomes double an on-period T3 of a PWM signal 110 before switching the frequency. In other words, control is executed such that a value obtained by multiplying the multiplication factor of the frequency by the on-period of the PWM signal becomes constant before and after switching the frequency. Further, a period T4 until rising of a PWM signal 111 is set at a value obtained by subtracting the on-period T5 from a cycle of the original frequency. The setting is executed by the counter provided at the clock generation circuit 32. By this, the output voltage Vout is prevented from ripple caused by switching the frequency of the clock signal CLK. This is because the average value of the inductance current $I_L$ is prevented from fluctuation before and after switching the frequency of the clock signal CLK. A PWM signal 112 subsequent to the initial PWM signal 111 after switching the frequency of the clock signal CLK is supplied from the RS latch circuit 23. In other words, the PWM signal set by the clock signal CLK and reset by the output signal of the comparator circuit 22 is supplied to the drive circuit 24.

According to the present embodiment, the on-period of the PWM signal immediately after switching the frequency of the clock signal CLK is set in accordance with the on-period of the PWM signal before switching the frequency. In this manner, the output voltage Vout can be prevented from ripple caused by switching the clock signal CLK.

The description has been given for the case where the output voltage Vout continuously decreases, but the same control can be applied to the case where the output voltage Vout continuously increases. For instance, in the case where a load becomes light, the output voltage Vout continuously increases. In the case where the output voltage Vout continuously increases, the error value error becomes continuously a negative value, for example. Therefore, in the same manner, the continuous increase of the output voltage Vout can be detected by comparing a total value of error values error in latest five cycles with a predetermined threshold value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power circuit, comprising:

a switching transistor having a main current path connected between an input terminal applied with an input voltage and an output terminal supplying an output voltage;

a drive circuit configured to output a drive signal that controls on/off of the switching transistor with pulse width modulation;

an error calculation circuit configured to compare the output voltage with a reference voltage and output an error value based on the comparison;

a compensating circuit configured to generate and output a control value based on the error value of the error calculation circuit;

a comparator circuit configured to compare a feedback current of a load current with the control value and output a signal indicating a result of the comparison;

a determination circuit configured to calculate a total value of error values successively output from the error calculation circuit during a certain period corresponding to a predetermined number of switching cycles of the switching transistor, compare the total value with a predetermined threshold value, and output a control signal when the total value exceeds the threshold value, wherein the predetermined number is greater than one; and a control circuit configured to increase a frequency of the drive signal in response to the control signal, wherein an original frequency of the drive signal is increased to a frequency multiplied by a multiplication factor, when the total error value exceeds the predetermined threshold value, wherein the multiplication factor is greater than one.

2. The power circuit according to claim 1, comprising:

a clock generation circuit configured to generate and output a clock signal; and an RS latch circuit configured to respond to the signal from the comparator circuit and the clock signal and output an output signal, wherein the clock signal output from the clock generation circuit is controlled by the control circuit.

3. The power circuit according to claim 2, wherein the drive circuit outputs the drive signal in response to the output signal from the RS latch circuit.

4. A control method for a power circuit configured to execute control so as to equalize an output voltage to a reference voltage by controlling an on-period of a switching transistor with pulse width modulation, the switching transistor being controlled to be turned on/off by a drive signal, the control method comprising:

comparing the output voltage with the reference voltage;

outputting an error value based on the comparison between the output voltage and the reference voltage;

outputting a control value based on the error value;

comparing a feedback current of a load current with the control value to output a signal indicating a result of the comparison;

calculating a first total error value of error values successively output during a first period corresponding to a first predetermined number of switching cycles of the switching transistor, wherein the first predetermined number is greater than one;

comparing the first total error value with a predetermined threshold value;

increasing a frequency of the drive signal from an original frequency to an increased frequency multiplied by a multiplication factor, when the first total error value exceeds the predetermined threshold value, wherein the multiplication factor is greater than one.

5. The control method for a power circuit according to claim 4, further comprising returning the frequency of the drive signal from the increased frequency to the original frequency when a predetermined period has passed.

6. The control method for a power circuit according to claim 4, further comprising:

calculating a second total error value of the first predetermined number of the error values successively output during a second period corresponding to a second predetermined number of switching cycles of the switching transistor in the increased frequency when the first total error value exceeds the predetermined threshold value, wherein the second predetermined number is greater than one;

comparing the second total error value with the predetermined threshold value; and further increasing the frequency of the drive signal from the increased frequency to a further increased frequency when the second total error value exceeds the predetermined threshold value.

7. The control method for a power circuit according to claim 4, wherein in the event of increasing the frequency of the drive signal from the original frequency to the increased frequency multiplied by the multiplication factor, the method further comprises controlling an on-period of an initial drive signal after increasing to increased frequency to become a value obtained by dividing an on-period of the drive signal immediately before increasing the frequency by the multiplication factor.

8. The control method for a power circuit according to claim 4, wherein the power circuit further comprises a clock generation circuit configured to generate a clock signal that controls rising of the drive signal, and the method further comprises shifting a phase of the clock signal in synchronization with timing when the total error value exceeds the predetermined threshold value.

9. The control method for a power circuit according to claim 5, wherein the power circuit further comprises a clock generation circuit configured to generate a clock signal that controls rising of the drive signal, and the method further comprises shifting a phase of the clock signal in synchronization with timing when the total error value exceeds the predetermined threshold value.

10. The control method for a power circuit according to claim 6, wherein the power circuit further comprises a clock generation circuit configured to generate a clock signal that controls rising of the drive signal, and the method further comprises shifting a phase of the clock signal in synchronization with timing when the total error value exceeds the predetermined threshold value.

11. The control method for a power circuit according to claim 4, wherein the power circuit further comprises a compensating circuit configured to generate a control value that controls the on-period of the drive signal based on the error value in accordance with a predetermined compensation coefficient, and the method further comprises switching the compensation coefficient to a compensation coefficient that accelerates response in the event of increasing the frequency of the drive signal.

12. The control method for a power circuit according to claim 11, further comprising switching the compensation coefficient to a compensation coefficient that mitigates acceleration when the output voltage reaches a lowest point or a highest point.

13. A control method for a power circuit, the power circuit including:

a switching transistor having a main current path connected between an input terminal applied with an input voltage and an output terminal supplying an output voltage;

an error calculation circuit configured to compare the output voltage with a reference voltage and output an error value;

a compensating circuit configured to generate and output a control value based on the error value of the error calculation circuit;

a comparator circuit configured to compare the control value with a feedback current of current flowing in the main current path, and output an output signal indicating a result of the comparison;

a clock generation circuit configured to output a clock signal having a variable frequency;

an RS latch circuit configured to generate a PWM signal in response to the output signal from the comparator circuit and the clock signal; and a drive circuit configured to output a drive signal to control on/off of the switching transistor in response to the PWM signal of the RS latch circuit, the method comprising:

monitoring a fluctuation of the output voltage by calculating a total value of error values successively output from the error calculation circuit during a certain period; and increasing a frequency of the clock signal when the total value of the error values exceeds a predetermined threshold value, wherein when increasing the frequency of the clock signal of the clock generation circuit, the control value after increasing the frequency is set such that an average values of feedback currents before increasing the frequency becomes equal to an average value of feedback currents after increasing the frequency.

14. The control method for a power circuit according to claim 4, further comprising:

calculating a second total error value of the first predetermined number of the error values successively output during a second period corresponding to a second predetermined number of switching cycles of the switching transistor in the increased frequency when the first total error value exceeds the predetermined threshold value, wherein the second predetermined number is greater than one;

comparing the second total error value with the predetermined threshold value;

further increasing the frequency of the drive signal from the increased frequency to an further increased frequency when the second total error value exceeds the predetermined threshold value; and returning the frequency of the drive signal from the further increased frequency to the original frequency when a predetermined period has passed.

* * * * *